United States Patent [19]

Kolbe et al.

[11] Patent Number: 4,981,655
[45] Date of Patent: Jan. 1, 1991

[54] CHEMICAL OXYGEN GENERATOR

[75] Inventors: Ernst G. Kolbe, Mölln; Rainer Ernst, Curau; Hans-Burkhardt Fiedler, Neustadt, all of Fed. Rep. of Germany

[73] Assignee: Drägerwerk Aktiengesellschaft, Lübeck, Fed. Rep. of Germany

[21] Appl. No.: 216,705

[22] Filed: Jul. 8, 1988

[30] Foreign Application Priority Data

Jul. 29, 1987 [DE] Fed. Rep. of Germany ....... 3725105

[51] Int. Cl.$^5$ ............................................. A62B 7/08
[52] U.S. Cl. ................................... 422/165; 422/120; 422/126; 422/305; 102/530
[58] Field of Search ............... 422/120, 126, 165, 305; 128/202.26; 102/530

[56] References Cited

U.S. PATENT DOCUMENTS

| | | | |
|---|---|---|---|
| 3,767,367 | 10/1973 | Rio | 422/126 |
| 3,861,880 | 1/1975 | Thompson | 422/126 |
| 3,868,225 | 2/1975 | Tidd | 422/126 |
| 3,902,934 | 9/1975 | Timmerman | 422/165 |
| 4,590,041 | 5/1986 | Hill | 422/165 |

FOREIGN PATENT DOCUMENTS 561783  8/1958  Canada.
3039442 5/1982  Fed. Rep. of Germany.

Primary Examiner—Robert J. Warden
Assistant Examiner—John Griffith, Jr.
Attorney, Agent, or Firm—Walter Ottesen

[57] ABSTRACT

A chemical oxygen generator has a chemical mixture based on an alkali-metal chlorate ($NaClO_3$) which constitutes the charge of a cartridge having an ignition device and an oxygen outlet. This oxygen generator is improved so that the charge is insensitive to shock and so that it can be configured in any desired outer form and size and that an advancing reaction zone is assured without a further assisting device. The charge includes a tight bed of chemical pellets which lie one against the other to form the smallest possible contact surfaces.

9 Claims, 1 Drawing Sheet

CHEMICAL OXYGEN GENERATOR

FIELD OF THE INVENTION

The invention relates to a chemical oxygen generator having a chemical mixture based on alkali-metal chlorate, especially sodium chlorate ($NaClO_3$). The chemical mixture constitutes the charge of a cartridge having an ignition device and an oxygen outlet.

BACKGROUND OF THE INVENTION

An oxygen generator of the above kind is disclosed in German published patent application No. DE-OS 30 39 442.

The known oxygen generators have a charge in the form of a pressed chlorate body which is known as an oxygen candle and which is present either as an individual candle or the charge can be put together from a plurality of individual candles which are connected in series. These candles are accommodated in a housing equipped with heat insulation and an ignition device is provided for igniting the start candle which releases oxygen with the development of heat. The oxygen is conducted to a consumer from an appropriate oxygen outlet.

The pressed chemical mass must not have any hollow spaces or even fissures during its manufacturing process since defects prevent a uniform decomposition during use. In order to assure an uninterrupted supply capability of the released oxygen, care must be taken to ensure that the heat transfer during the advance of the reaction zone to the undecomposed chemical takes place without interruption and that the heat quantity necessary for maintaining the decomposition is maintained during the entire period of use while maintaining the required ignition temperature. It is therefore always necessary that even during transport of manufactured oxygen generators and even during their use such as an oxygen supply in a breathing protective apparatus not the slightest fissure or crumbling within the pressed chemical mass occurs. This can lead to a condition wherein the unit is unfit for use and which cannot be detected in advance. For this reason, complex protective measures are necessary to protect the chemical cartridge of the known oxygen generator from vibrations.

In those embodiments wherein a plurality of candles are series connected one behind the other, the intermediate spaces which are produced in this manner between the individual candles must be bridged by means of further ignition devices.

The quantity of oxygen provided by the pressed individual candles is dependent upon the quantity of the chemical mass which, however, cannot be increased at will to increase the quantity of oxygen delivered. The pressing tools necessary for this purpose bear no economic relationship to the targeted use. Even connecting ever more individual candles one behind the other has its limitation in the difficulty to control the many ignition transmissions which follow one behind the other in addition to the large configuration which such a unit must have.

SUMMARY OF THE INVENTION

It is an object of the invention to provide an oxygen generator of the kind described above which is improved so that the charge is insensitive to shock and can be configured in every desired external form and size. It is a further object of the invention to provide such a chemical oxygen generator wherein the advance of the reaction zone is assured without further supporting means.

According to a feature of the invention, the charge of the oxygen generator comprises a tight bed of chemical pellets which lie one against the other to form the smallest possible contact surfaces. This feature of the invention is based on the surprising recognition of the condition that the interruption of the reaction occurs in the known pressed individual candles at fissures or interface surfaces as a consequence of the drain of the transferring heat into the large volume of the following candle body. It is for this reason that the location at which the heat transfer occurs cannot become heated to the reaction temperature.

In contrast to the above, the arising reaction heat is maintained in a very tight region at an appropriately higher temperature by means of the small surface contact of each individual pellet to the pellet lying directly next to the latter. The hot gas generated by the reaction flows over the large surfaces of the pellets and effects an intensive preheating. With the intimate contact at the small contact surfaces, the ignition can be reliably transmitted to the next pellet under this precondition. The chemical pellets lying tightly one next to the other are also insensitive to shock and vibration. Now only a container of suitable size must be provided with a charge for producing cartridges capable for delivering high quantities of oxygen. The form and magnitude of the cartridges are now no longer dependent upon the possibility to be able to press appropriate candles. A preferred composition of a chemical pellet on the basis of an alkali-metal chlorate comprises:

90–97% sodium chlorate ($NaClO_3$)
0–6% sodium monoxide ($Na_2O$)
1–5% mica
0–0.5% silicon
0–10% sodium peroxide ($Na_2O_2$)

The pellets are preferably tempered for 3 to 20 hours at 100° to 200° C. for increasing the resistance to breakage thereof.

It is advantageous to provide a pretensioning arrangement for acting on the chemical pellets in order to ensure resistance to shock and vibration during preparation and to cancel out changes in volume of the chemical pellets during the reaction and thereby assure a permanent intimate contact of the pellets to one another. In this way, the remaining chemical pellets which have not yet decomposed are held in contact to one another to facilitate the transmission of the ignition from one pellet to the next during the reaction process notwithstanding the volume reduction.

It is advantageous to configure the charge out of several zones of different reaction speed which are connected one behind the other in order to provide different oxygen supply capacities. A first zone having a high reaction speed can be advantageously provided by means of a selection of different admixtures of silicon and metal oxides as a catalyst to the chemical mixture. This chemical mixture has a correspondingly high oxygen supply capacity. This first zone is followed by a further zone having a lower catalyst component in the chemical mixture which has a correspondingly lower reaction speed for providing a reduced oxygen supply capacity.

A further advantageous composition of the chemical charge of the individual pellets includes providing the pellets to have different particle sizes such that additional chemical pellets of smaller particle size are sprinkled over the pellets of larger particle size and settle into the interspaces formed by the pellets of larger particle size. In this way, it is possible to increase the density of the charge by means of the smaller pellets. When all of the interspaces are filled, a further shaking of the entire charge with the cartridge housing closed can increase the volume of the original charge so that the walls of the cartridge are placed under tension. With this filling process, the cartridge walls are utilized as a pretensioning arrangement which presses the individual pellets against each other thereby assuring the necessary contact surfaces during the chemical reaction. In this context, it can be advantageous to provide the chemical pellets of different particle size with different mixture proportions with respect to their constituents. In this way, a mixture of fast-reacting chemical is obtained in the interspaces of the charge with a slowly reacting chemical as the primary constituent so that the ignition transfer from one pellet to another is still further increased.

Generally, every form of chemical pellet is suitable and especially pellets having an approximately spherical form or pellets having a cylindrical form with end faces which are each configured to be hemispherical. The pellet spheres can be made of layers having different reaction speeds which encase one another (laminated pellets). With these cylindrically-shaped pellets, it is also advantageous to provide alternate layers wherein a layer of fast reaction speed follows a layer of slow reaction speed (multi-layered pellets). With this measure, the effect is achieved that the contact surfaces of the individual pellets can better transmit the required quantity of heat for igniting the adjoining pellet.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
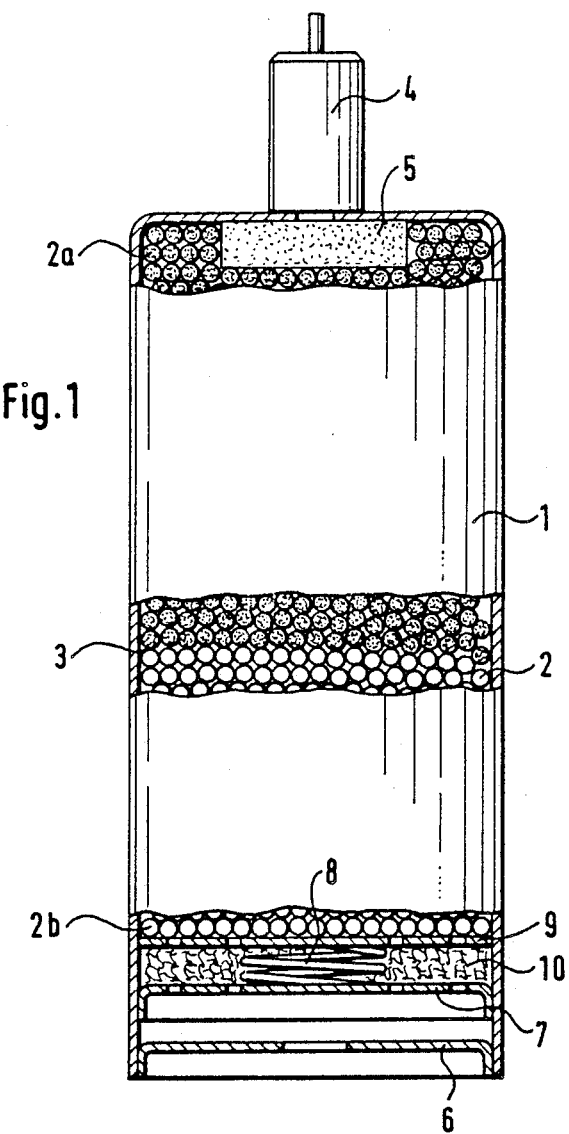
FIG. 1 is an elevation view, in section, of an embodiment of a chemical oxygen generator according to the invention; and, FIG. 2 is a section view of a multi-layered chemical pellet.

The chemical oxygen generator shown in FIG. 1 includes a cartridge 1 which is filled with a charge (2a, 2b) of chemical pellets 2 for releasing oxygen. At a first one of its ends, the cartridge 1 has an ignition device 4 and a starter charge 5. At the second end lying opposite the ignition device 4, the cartridge 1 is provided with an outlet base 6 from which the oxygen is released during operation and can be conducted to a consumer (not shown). A permeable base shell 7 is disposed ahead of the outlet base 6 and is attached to the inner wall surface of the cartridge. The permeable base shell 7 supports a pressure spring 8 which acts on a permeable charge base 9 freely movable inside the cartridge 1. The intermediate space between the base shell 7 and the charge base 9 is filled with a dust filter 10.

The chemical pellets 2 are ignited with the aid of the ignition device 4 and the starter charge 5 to operate the oxygen generator with the pellets 2 releasing oxygen while developing heat. The reacting pellets 2 thereby form an advancing reaction front 3 along the charge which leaves a reacted portion 2a of the charge behind and advances into the portion 2b of the charge which has not yet reacted. Oxygen is released during this process and passes through the permeable charge base 9, the dust filter 10 and the permeable base shell 7 to the outlet base 6 from which it can be conducted to a consumer. A reduction in volume is compensated for by the charge base 9 which is displaced as a consequence of the spring force of the pressure spring 8. The dust particles released during the development of the oxygen are held by the dust filter 10.

Figure 2:
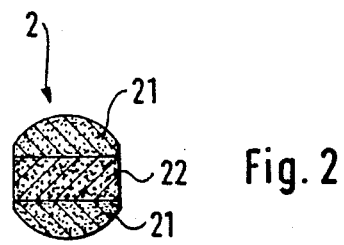

FIG. 2 shows an individual chemical pellet 2 which comprises a cylindrical center part 22 and two hemispherical end parts 21. The center part 22 includes a chemical having a low reaction speed and the outer parts 21 contain a chemical having a higher reaction speed.

It is understood that the foregoing description is that of the preferred embodiments of the invention and that various changes and modifications may be made thereto without departing from the spirit and scope of the invention as defined in the appended claims.

What is claimed is:

1. A chemical oxygen generator comprising:
    a cartridge housing having first and second ends;
    a charge of chemical pellets disposed in said housing between said ends, said pellets being made of a chemical mixture including an alkali-metal chlorate;
    an ignition device mounted at said first end for initiating a chemical reaction in said charge to release the oxygen;
    oxygen outlet means formed at said second end for passing the oxygen generated in said chemical reaction from said housing; and,
    biasing means for imparting a biasing force to said pellets so as to cause each two mutually adjacent ones of said pellets to make contact with each other at the smallest possible contact interface to facilitate the transmission of the ignition from one pellet to the next.

2. The chemical oxygen generator of claim 1, wherein said alkali-metal chlorate is sodium chlorate ($NaClO_3$).

3. The chemical oxygen generator of claim 1, said biasing means being a spring for applying said biasing force to said charge to increase the contact pressure at said contact interfaces between said pellets.

4. The chemical oxygen generator of claim 1, said charge being subdivided into a plurality of zones connected in series one next to the other; each of said zones containing a plurality of pellets having a reaction velocity different from the reaction velocity of the pellets contained in the next adjacent zone.

5. The chemical oxygen generator of claim 4, wherein the reaction velocity of the pellets in each of said zones is determined by different admixtures of additives.

6. The chemical oxygen generator of claim 1, said pellets having different particle sizes such that the pellets having a larger particle size conjointly define a plurality of interspaces therebetween; and, the pellets having a smaller particle size settling through and into said interspaces thereby increasing the density of said charge.

7. The chemical oxygen generator of claim 6, said pellets having the smaller particle size containing constituents in a mixture proportion to provide a first reaction velocity and said pellets having the larger particle size containing constituents in a mixture proportion to provide a second reaction velocity slower than said first reaction velocity.

8. The chemical oxygen generator of claim 1, each of said pellets being a multilayered pellet with each two mutually adjacent ones of the layers having respectively different reaction velocities.

9. The chemical oxygen generator of claim 8, one of said layers encasing the other one of said layers.

* * * * *